July 2, 1968  G. D. PARSONS ET AL  3,390,974
ALIGNMENT STRUCTURE FOR A GLASS MOLD AND PLUNGER
Filed April 5, 1965
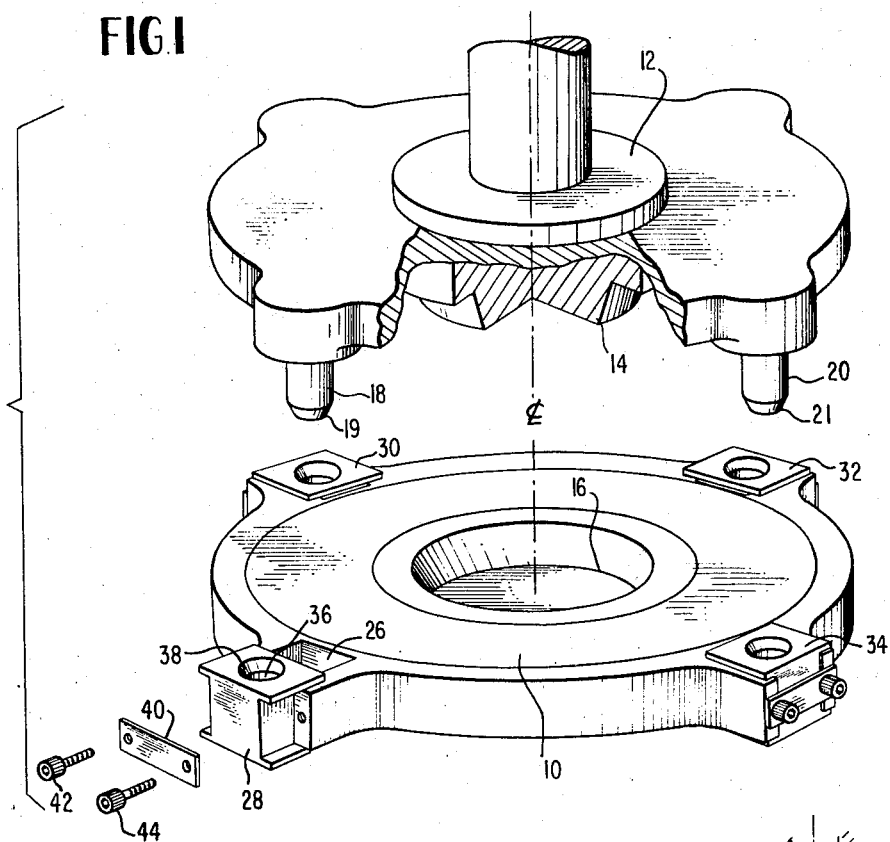
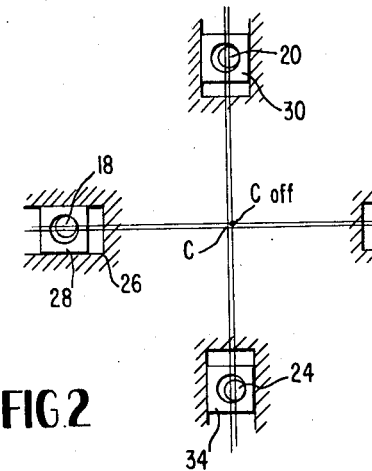
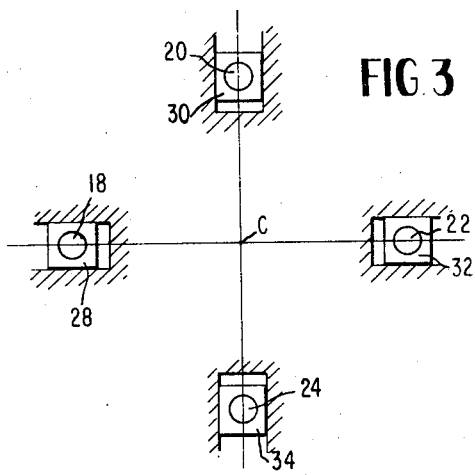
INVENTORS
GEORGE D. PARSONS
THOMAS J. RAYESKI
BY *Sughrue, Rothwell, Mion, Zinn & Macpeak*
ATTORNEYS

United States Patent Office 3,390,974
Patented July 2, 1968

3,390,974
ALIGNMENT STRUCTURE FOR A GLASS MOLD AND PLUNGER
George D. Parsons and Thomas J. Rayeski, Corning, N.Y., assignors to Corning Glass Works, Corning, N.Y., a corporation of New York
Filed Apr. 5, 1965, Ser. No. 445,455
8 Claims. (Cl. 65—323)

ABSTRACT OF THE DISCLOSURE

A glass mold and plunger are provided with an alignment system including a number of pins on one part spaced about a desired center line and cooperating with slidably mounted bushing blocks on the other part. The bushing blocks are precision bored and replaceable, and they slide in radial slots angularly spaced equal to the pins. The pins have tapered tips for cooperating with tapered entrances to the bushing holes.

---

This invention relates to improvements in aligning and centering arrangements and especially such arrangements adapted for use in glass forming equipment.

Although this invention will be described for use with glass forming equipment to illustrate the applicability and unique features thereof, it is not restricted to such equipment but is also applicable to other machine parts where it is desired to align two machine parts about a center and where these parts may be subjected to radial and thermal expansion and cyclic coupling is imposed as in glass forming equipment.

Glass forming equipment such as a glass press usually includes a plunger and a mold which are cyclicly relatively reciprocal and when together define a cavity having the shape of the pressed ware. A hot gob of glass is commonly placed in the mold and the plunger is brought down on the mold to press out the ware to the desired configuration. Upon the glass forming equipment receiving a well centered and well shaped charge of hot glass in gob form, the glass forming equipment will automaticaly symmetrically shape a particular product only if the individual parts of the equipment, such as the plunger and mold, are accurately aligned or centered with respect to each other.

There have been prior alignment arrangements known in the art for glass forming equipment. The prior alignment arrangements are utilized with floating plungers or molds for self-centering engagement to provide or allow for thermal expansion of one part of the equipment with respect to the other during operation. In the use of floating plungers or molds, which are necessary in glass forming equipment to eliminate trouble due to thermal expansion in the alignment and wear of the parts, it is known to incorporate radial keys and keyways. However, these known arrangements have inherent inaccuracies due to accumulation of machine tolerances, difficulty in milling the keyways completely and accurately symmetrical, and the key and keyway wear due to the cyclic operation of the equipment. Further, when it is desired to replace or repair molds of the type having keys and keyways, it is a very tedious, expensive and time-consuming operation due to the difficulty in reproducibility of the machining operation when a plurality of interchangeable molds and interchangeable plungers are manufactured for production.

Accordingly, the present invention provides an arrangement for the alignment or centering of two machine parts about a desired center in which one of the machine parts is floatingly mounted with respect to the other and in which the alignment is accomplished by pins rigidly attached to one of the parts and engaging holes in jig bored slidable bushings in the other of the parts. This arrangement reduces wear and greatly increases the reproducibility, accuracy and interchangeability of certain machine parts used in such an alignment system.

The foregoing and other objects, features and advantages of the invention will be apparent from the following more particular description of a preferred embodiment of the invention, as illustrated in the accompanying drawings.

In the drawings:

FIG. 1 is an exploded perspective view with a portion shown in section of the alignment and centering arrangement of this invention;

FIG. 2 is a schematic view showing the two machine parts off a desired center when they start to move into mating relationship but before they are aligned by the alignment system of this invention; and FIG. 3 is a schematic illustration similar to FIG. 2 showing the two parts after they have been completely aligned and centered.

Referring to FIG. 1, there is shown a first machine part which is illustrated as a glass press mold 10 and a second machine part 12 which is a glass press plunger assembly. The two parts are mounted for relative movement with respect to one another about a center line ₵ and one or the other of the two parts may be floatingly mounted as is well known in the art. The plunger assembly 12 includes a glass shaping plunger 14 which cooperates with a mold configuration 16 in mold 10 to define the desired shape of the ware to be produced. It is apparent that accurate aligning or centering of the two parts about the center line ₵ is necessary to produce symmetrical ware. It is also desirable that one of the two parts be floatingly mounted with respect to the other so that the thermal expansion in the cyclic operation does not cause binding and undue wear.

The alignment system of this invention includes at least three alignment pins such as alignment pins 18, 20, 22 and 24 angularly spaced a sufficient distance apart so as to effect alignment about center line ₵ and rigidly mounted on one of the two parts, such as plunger assembly 12. Preferably each pin has a tapered tip, such as tip 19 of pin 18 and tip 21 of pin 20.

The mold 10 includes four open-ended slide slots 26 extending radially toward the center line ₵ for slidably mounting at least three bushings corresponding in number and position to the pins. In the illustrated embodiment there are four bushing blocks 28, 30, 32 and 34. Since the bushing blocks are identical and they are all slidably mounted in corresponding slots 26, only one bushing will be described in detail. Each bushing block includes an accurately positioned or jig bored hole 36 preferably having a tapered entrance 38 thereinto. The outer ends of the slots 26 are enclosed by a bridging piece 40 secured to the mold 10 by cap screws 42 and 44.

In the alignment system of this invention the bushings 28, 30, 32 and 34 are positioned in their slots 26 and are clamped or shimmed therein in a generally central position. Then a jig is used to bore the holes 36 and the tapered entranceway 38 very accurately. This procedure precludes the necessity for accurate angularly located radial slots 26 with respect to orientation about the center of the machine part and with respect to each other, in direct contrast to the prior mentioned key and keyway system. Thereafter the clamping or shimming means are removed so that the bushings 28, 30, 32 and 34 with their jig bored holes 36 may partake of radial siding movement relative to the center line ₵. The taper on the tips such as 19 and 21 of pins 18 and 20 respectively, is governed by the distance of such radial movement provided for in the slots 26. The jig for boring the bushings corresponds to the position of the pins 18, 20, 22 and 24, so that when the pins are aligned in the holes in the bushings the two parts 10 and 12 are accurately aligned about their mutual center line ₵.

Assuming part 12 is floatingly mounted and is moved relative to part 10 in a cyclic operation such as, for example, pressing glass, and further assume that as the plunger assembly 12 approaches the mold 10 it is slightly off-center ($C_{off}$) as shown in FIG. 2, then the tapered tips such as tips 19 and 21 of pins 18 and 20 will initially engage the tapered entrances 38 to holes 36 in the bushing blocks corresponding to the pins and with cause the relatively floating plunger assembly 12 and mold 10 to align themselves with the center C prior to the actual pressing operation which takes place after complete alignment as shown in FIG. 3.

As viewed in FIG. 2, $C_{off}$ is above and to the right of C. Assume the mold is laterally stationary and the plunger is floating, as the tapered tips of pins 20 and 24 engage the tapered entrances 38 of holes 36 in bushing blocks 30 and 34, the floating plunger is moved to the left relative to the mold. Also at such time pins 18 and 22 in the tapered entrance to bushing blocks 28 and 32 cause the plunger to move toward the bottom of the schematic of FIG. 2. If, due to thermal expansion, wear or the like, one of the pins contacts its bushing before the other pins, the bushing partakes in radial movement during the first phase of the alignment operation. These movements on the pressing stroke of the plunger align the plunger and mold on center C before the ware is formed in the mold cavity and such alignment and centering is shown in FIG. 3.

Three or more sets of pins and bushings must be utilized for effective alignment of the plunger assembly 12 and mold 10, one of which is floating and the other being fixed. This alignment system provides for accurate symmetrical compensation for thermal expansion of the forming equipment and also lends itself to accurate manufacture, reproducibility and interchangeability of certain machine parts due to the fact that the holes 36 are jig bored, as opposed to milling slots. Further, wear in the system is around the edges of the holes 36, thus in repairing or replacing mold equipment the bushings are merely removed, new sets of bushings are placed therein and the new bushings are jig bored with the same precision jig.

While the invention has been particularly shown and described with reference to a preferred embodiment thereof, it will be understood by those in the art that various changes in form and details may be made therein without departing from the spirit and scope of the invention.

What is claimed is:

1. An alignment and centering arrangement for a glass press mold assembly and plunger assembly which are floatingly mounted for cyclic reciprocating movement toward and away from one another along a desired center line, the alignment and centering arrangement comprising; at least three pins angularly spaced apart from each other about said center line a distance sufficient to effect alignment centering and rigidly attached to one of said assemblies, at least three blocks having jig bored holes for receiving said pins, radial directed slots in the other of said assemblies similarly equally spaced about the center line for slidably journalling the bushing blocks for radial movement relative to said center, and means defining at least one tapered surface between the tips of each of the pins and entrances to the jig bore holes of each of said corresponding bushing blocks.

2. An alignment and centering arangement for two mating non-rotatable machine parts movable axially toward one another such as a complementary plunger and mold of glass forming equipment, the alignment and centering arrangement comprising; a first machine part, a second machine part floatingly mounted for axial movement relative to the first machine part on a desired center line, at least three pins angularly spaced apart from each other with respect to the center line a distance sufficient to effect alignment centering, the pins being rigidly mounted in one of the machine parts, at least three bushing blocks, radial slots angularly spaced apart equal to the spacing of the pins, the slots slidably mounting the bushing blocks for sliding radial movement with respect to the desired center line, each bushing block including a precision positioned bore therein of a size and shape for cooperation with a corresponding one of the pins, so that when the pins are received in the bores in the slidable bushings, the first and second machine parts are accurately aligned at the desired center line, and a tapered surface on the ends of the pins or entrance to the bores in the bushing blocks.

3. An alignment and centering arrangement as defined in claim 2 wherein the pins are mounted on the second machine part.

4. An alignment and centering arrangement as defined in claim 2 wherein the ends of the pins, which are first received in the corresponding cooperating bores are tapered.

5. An alignment and centering arrangement as defined in claim 2 wherein the entrance edges of the precision positioned bores of the bushings are tapered.

6. An alignment and centering arrangement as defined in claim 5 wherein the ends of the pins, which are first received in the corresponding cooperating bores, are tapered.

7. An alignment and centering arrangement as defined in claim 2 wherein the first and second machine parts are a cooperating mold and plunger of a glass forming press.

8. An alignment and centering arrangement as defined in claim 2 wherein the bushings are slidably mounted in open-ended slots provided in one of the machine parts and the open end of the slots are closed with bridge pieces.

References Cited

UNITED STATES PATENTS 2,966,006   12/1960   Sherts et al. _____ 65—323

FOREIGN PATENTS 232,458   2/1961   Australia.
1,284,579   1/1962   France.

DONALL H. SYLVESTER, *Primary Examiner.*

ARTHUR D. KELLOGG, *Assistant Examiner.*